(12) United States Patent
Ge et al.

(10) Patent No.: US 8,853,957 B2
(45) Date of Patent: Oct. 7, 2014

(54) HIGH EFFICIENCY CONSTANT CURRENT LED DRIVER

(71) Applicant: Inventronics (Hangzhou), Inc., Hangzhou (CN)

(72) Inventors: Liangan Ge, Hangzhou (CN); Xiaoli Yao, Hangzhou (CN); Guichao Hua, Hangzhou (CN)

(73) Assignee: Inventronics (Hangzhou), Inc., Hangzhou (CN)

( * ) Notice: Subject to any disclaimer, the term of this patent is extended or adjusted under 35 U.S.C. 154(b) by 0 days.

(21) Appl. No.: 13/901,982

(22) Filed: May 24, 2013

(65) Prior Publication Data

US 2013/0320871 A1 Dec. 5, 2013

Related U.S. Application Data

(63) Continuation of application No. 12/896,346, filed on Oct. 1, 2010.

(30) Foreign Application Priority Data

Oct. 1, 2009 (CN) .......................... 2009 1 0153404

(51) Int. Cl.
*H05B 41/16* (2006.01)
*H05B 33/08* (2006.01)

(52) U.S. Cl.
CPC ........ *H05B 33/0815* (2013.01); *H05B 33/0827* (2013.01); *Y02B 20/348* (2013.01)
USPC ........................................ 315/247; 315/291

(58) Field of Classification Search
USPC ............. 315/209 R, 219, 224, 225, 226, 247, 315/276, 291, 308
See application file for complete search history.

(56) References Cited

U.S. PATENT DOCUMENTS

| | | | |
|---|---|---|---|
| 6,714,425 B2 * | 3/2004 | Yamada et al. ............. | 363/21.12 |
| 7,071,762 B2 * | 7/2006 | Xu et al. ....................... | 327/423 |
| 7,176,660 B2 * | 2/2007 | Usui et al. ..................... | 323/207 |
| 7,772,782 B2 * | 8/2010 | Chu et al. ...................... | 315/247 |
| 8,102,164 B2 * | 1/2012 | Colbeck et al. ............... | 323/282 |
| 8,194,419 B2 * | 6/2012 | Ryu et al. ................... | 363/21.04 |
| 2012/0274298 A1 * | 11/2012 | Colbeck et al. ............... | 323/282 |

* cited by examiner

*Primary Examiner* — Thuy Vinh Tran
(74) *Attorney, Agent, or Firm* — Terry M. Sanks, Esq.; Beusse Wolter Sanks & Maire, P.A.

(57) ABSTRACT

The present invention discloses a high efficiency constant current LED driver, which comprises a rectification bridge, a PFC main circuit, an isolated DC/DC converter, a PFC controller and a PFC bus control circuit. Since the input voltage is an intermediate PFC bus voltage, which varies with the output voltage of the DC/DC converter. When the isolated DC/DC converter is an LLC resonant circuit, the operating frequency of the LLC circuit is close to the resonant frequency within a wide output voltage range. Thus, the gain range and the operating frequency is narrow, and can enable the constant current module to work with a high efficiency at a wide output voltage range. When the isolated DC/DC converter is a symmetric half bridge, or an asymmetric half bridge or a full bridge circuit, the duty cycle of DC/DC circuit is close to 50% within a wide output voltage range. Thus, the changing range of the duty cycle of the DC/DC converter will be narrow and can improve the efficiency dramatically.

11 Claims, 8 Drawing Sheets

HIGH EFFICIENCY CONSTANT CURRENT LED DRIVER

CROSS-REFERENCE TO RELATED APPLICATIONS

This is a Continuation of U.S. application Ser. No. 12/896,346 filed Oct. 1, 2010, which is now abandoned, which claims priority to Chinese Patent Application No. 200910153404.3 filed Oct. 1, 2009, which is incorporated herein in their entirety by reference.

BACKGROUND OF THE INVENTION

Exemplary embodiments of the present invention generally relate to a high efficiency constant current LED driver. More specifically, it relates to a kind of constant current circuit with active power factor correction (PFC), in which the intermediate bus voltage of power factor correction is adaptively changed with an output voltage, and it can get high efficiency during a wide output range.

A traditional method of a constant current driver for LED application is one active power factor correction (PFC) circuit plus one isolated DC/DC converter, and an output voltage of the PFC circuit is fixed. The topology of an isolated DC/DC converter is generally symmetric half bridge or asymmetric half bridge circuit, full bridge circuit, resonant circuit, which is usually made by three components (LLC).

For a traditional LLC resonant circuit, it is easy to implement zero voltage switching of the primary MOSFET and zero current switching of the secondary diode, which makes the LLC circuit get lots of advantages, such as low switching power loss, high efficiency, easy to be high frequency realized, and improving power density, etc.

The efficiency of LLC resonant circuit is highest when the operating frequency is close to the resonant frequency, so the normal operating point is always close to resonant frequency. When input voltage increases and output voltage reduces, the larger gain can be obtained by decreasing operating frequency; when the input voltage increases or output voltage reduces, the lower gain can be obtained by increasing operating frequency. But the modulation capability from the frequency for the gain is limited and the range is narrow. Even through the modulation is able to be adjusted, the operating frequency range is too wide and the efficiency is low. Thus, the LLC circuit is difficult to guarantee the high efficiency within the whole output voltage range, when it is used in constant current LED driver with wide output voltage range.

For traditional symmetrical half bridge, asymmetrical half bridge circuit, or full bridge circuit, the efficiency reaches the highest when the duty cycle is close to fifty percent (50%). Being used in a constant current LED driver with wide output voltage range, when the output voltage is low and the duty cycle is small, the efficiency is low.

BRIEF DESCRIPTION OF THE INVENTION

Exemplary embodiment of the present invention intend to solve the drawbacks of the prior art by providing a kind of technology to improve the efficiency of constant current LED driver, through regulating the intermediate bus voltage to adaptively track the output voltage, and make the DC/DC circuit operate at an optimum state. To settle the aforesaid drawbacks of the prior art as described above, exemplary embodiments of the present invention disclose a circuit which can improve a power factor of a power supply at a light load. The circuit comprises a filter configured with at least one filter capacitor, a light load detecting circuit, a light load, a logic control and power drive circuit, a switching transistor, a rectifier bridge, and a power factor correction circuit. The filter is configured to be placed before and/or after the rectifier bridge, the light load detecting circuit is configured to output a control signal to the logic control and power drive circuit which controls the switching transistor to conduct at heavy load and to cut off at light load in order to control a working status of the filter capacitor.

BRIEF DESCRIPTION OF THE DRAWINGS

Further descriptions and explanations of present invention accompanied by drawings and schemes is given below FIG. 1 discloses a block diagram illustrating an exemplary embodiment of a high efficiency constant current LED driver.

DETAILED DESCRIPTION OF THE INVENTION

Figure 1:
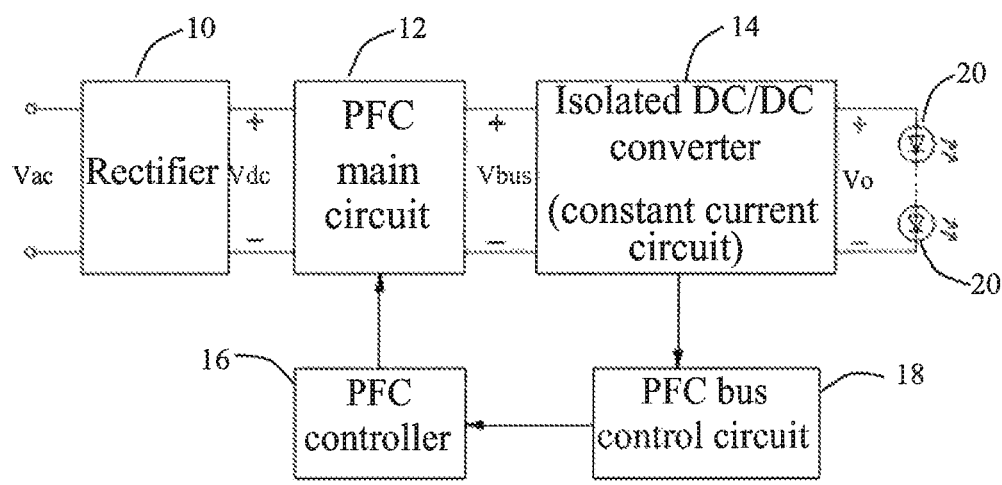

FIG. 1 discloses a block diagram illustrating an exemplary embodiment of a high efficiency constant current LED driver. The high efficiency constant current LED driver comprises a rectification bridge 10, a PFC main circuit 12, an isolated DC/DC converter 14, a PFC controller 16, and a PFC bus control circuit 18. The rectification bridge 10 rectifies the AC input voltage (Vac) and then outputs the DC voltage (Vdc) to the PFC main circuit 12. The PFC main circuit 12 receives the dc voltage (Vdc) from the rectification bridge 10 and the feedback voltage from the PFC controller 16, and then outputs the DC voltage (Vbus) to the DC/DC converter 14 through a PFC circuit. The isolated DC/DC converter 14 receives the DC voltage (Vbus) from the PFC main circuit 12, and then outputs a DC voltage (Vo) to the LED load 20 through a DC/DC converter and supplies a constant current to the LED load 20. The PFC controller 16 receives the control signal from the PFC bus control circuit 18, and sends the feedback signal to the PFC main circuit 12. The PFC bus control circuit 18 samples the signal from the output voltage (Vo) of the DC/DC converter 14 or an equivalent voltage of the output voltage (Vo), and outputs the signal to control the output feedback voltage of the PFC controller 16. Thus, the PFC intermediate bus voltage (Vbus) changes with the output voltage (Vo), which enables the isolated DC/DC converter 14 to keep working at a high efficiency and consequently improves the overall efficiency of the LED driver.

As illustrated in FIGS. 3, 4, 5, and 6, the PFC bus control circuit 18 comprises an output voltage sampling circuit 22 and a PFC output voltage modulation circuit 24. The input voltage signal of the output voltage sampling circuit 22 comes from an auxiliary winding in a main transformer (T1) of the isolated DC/DC converter 14, and it keeps the signal with the action of diode D4 and a capacitor C4. The output voltage sampling circuit 22 converts the input voltage signal to a signal that is in proportional to the output voltage (Vo), and then feeds the signal to the PFC output voltage modulation circuit 24. The output terminal of the PFC output voltage modulation circuit 24 connects with the input terminal of the PFC controller 16.

As further illustrated in FIGS. 3, 4, 5, and 6, the PFC main circuit 12 comprises an inductor L1, a switch (S1), a diode (D1) and a bus capacitor (C1). The positive terminal of rectified voltage (Vdc) is connected with a first terminal of an inductor (L), while a second terminal of the inductor (L1) is connected with a first terminal of the switch (S1) and an anode of the diode (D1), while a negative terminal of the rectified voltage (Vdc) is connected with a second terminal of the switch (S1). The bus capacitor (C1) is paralleled with a cathode of the diode (D1) and the second terminal of the switch (S1). The output terminal of the PFC controller 16 is connected with a third terminal of the switch (S1), and a series circuit comprised by a first resistor (R1) and a second resistor (R2) is paralleled with a bus capacitor (C1), while a common terminal of the first resistor (R1) and the second resistor (R2), as a feedback signal, is connected with the input terminal of the PFC controller 16 and the output terminal of the PFC output voltage modulation circuit 24.

The PFC output voltage modulation circuit 24 comprises a transistor (Q1), a resistor (R3) and a power supply (VCC). An output terminal of the output voltage sampling circuit 22 is connected with a base of the transistor (Q1), and an emitter of the transistor (Q1) is connected with one terminal of the resistor (R3), while the other terminal of the resistor (R3) is connected with the power supply (VCC), and a collector of the transistor (Q1) is connected with the common terminal of the first resistor (R1) and the second resistor (R2).

Figure 3:
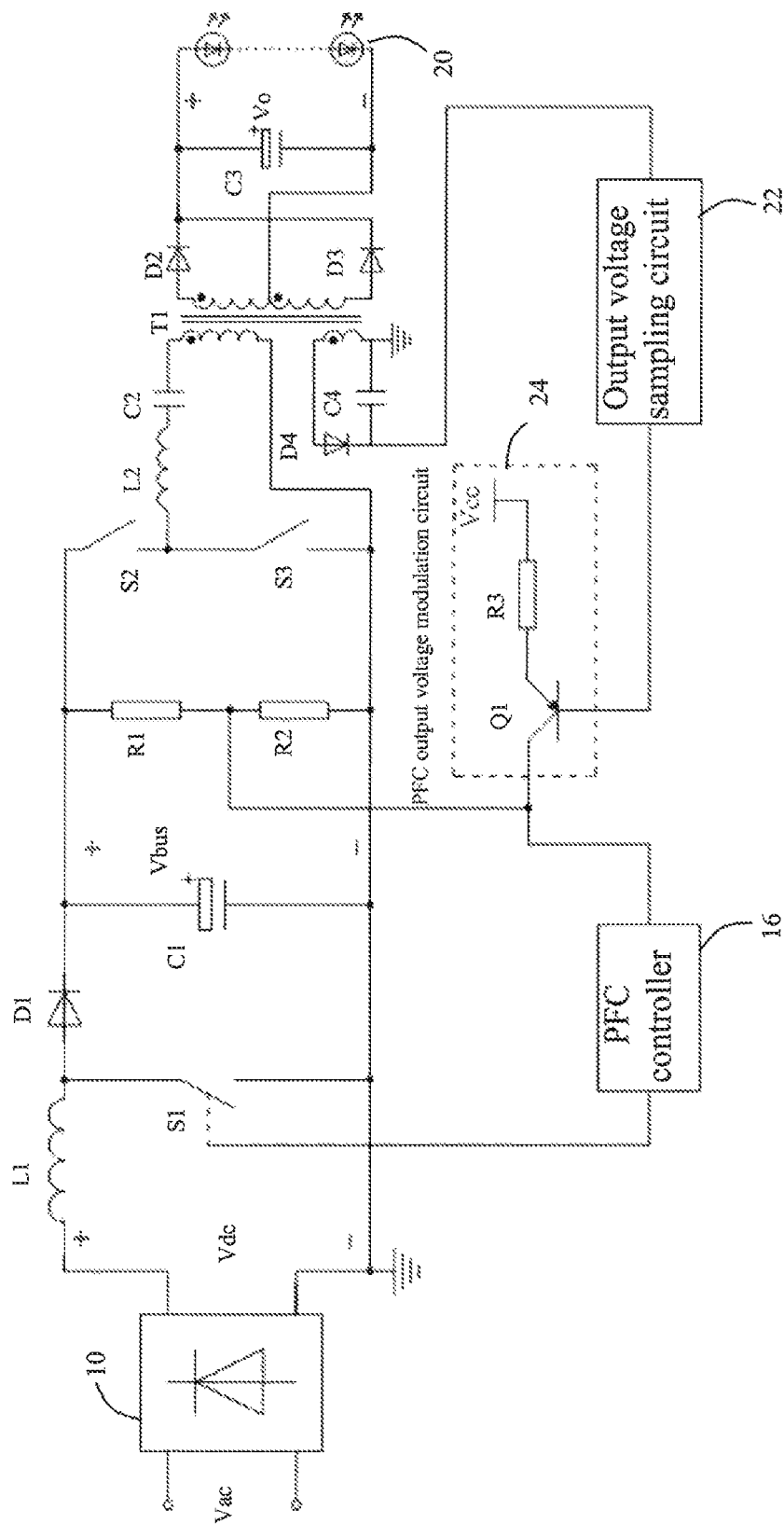
FIG. 3 discloses a circuit schematic of FIG. 1 with a LLC resonant converter.
Figure 4:
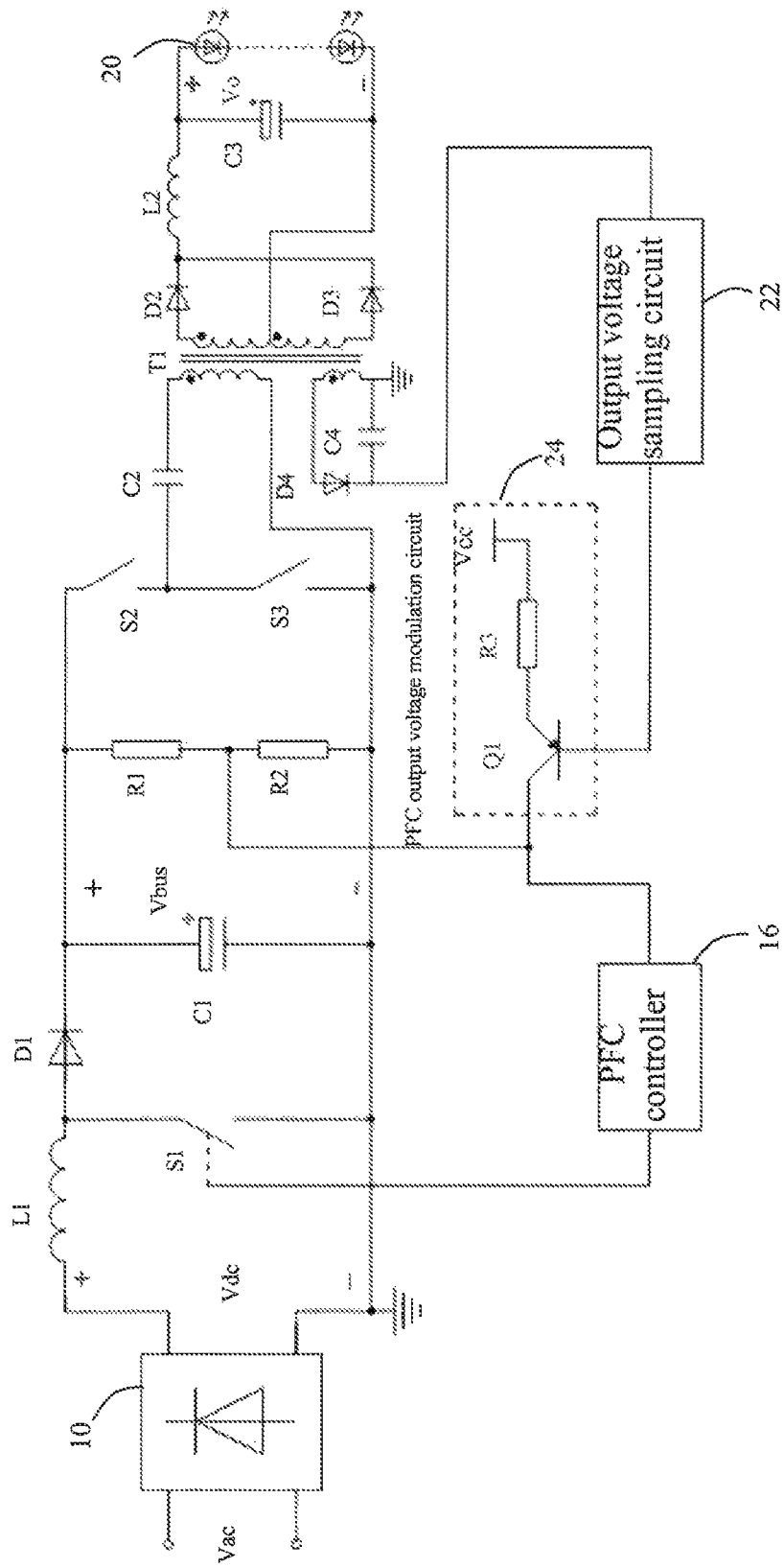
FIG. 4 discloses a circuit schematic of FIG. 1 with a Symmetric half bridge converter.
Figure 5:
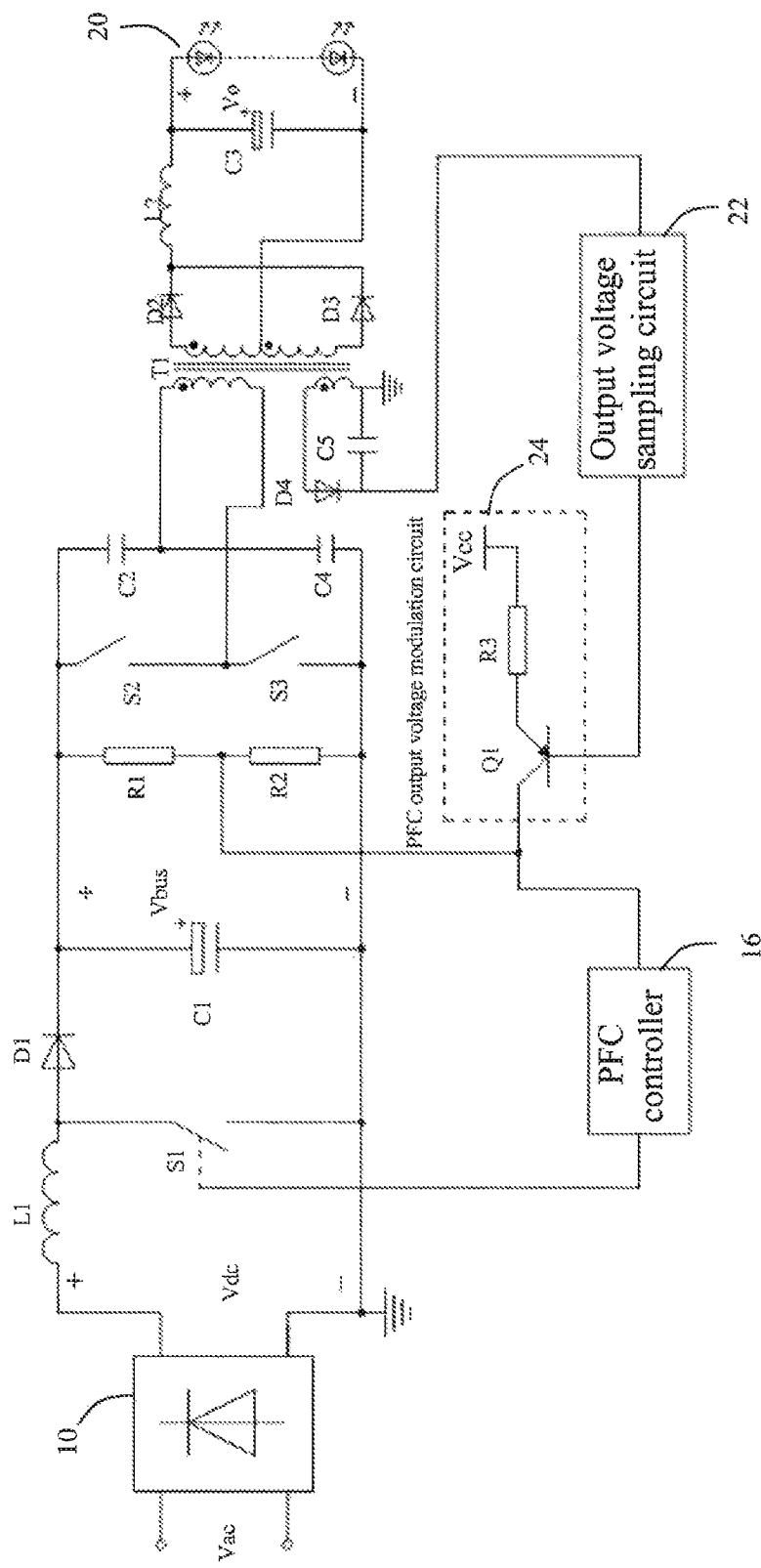
FIG. 5 discloses a circuit schematic of FIG. 1 with an Asymmetric half bridge converter.
Figure 6:
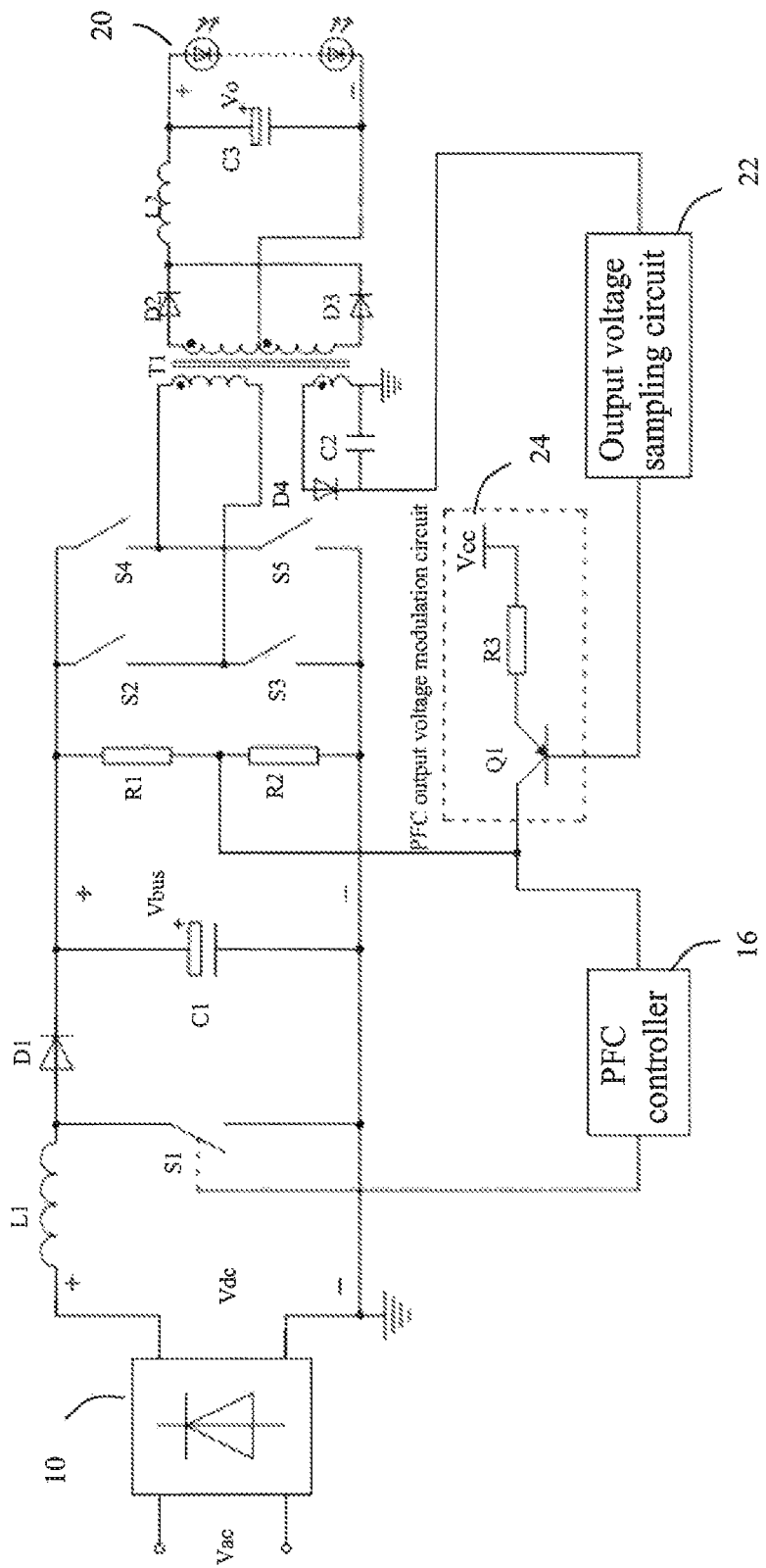
FIG. 6 discloses a circuit schematic of FIG. 1 with a Full bridge converter.

The isolated DC/DC converter 14 can be an LLC resonant circuit as illustrated in FIG. 3, or a symmetric half bridge circuit as illustrated in FIG. 4, or an asymmetric half bridge circuit as illustrated in FIG. 5, or a full bridge circuit as illustrated in FIG. 6. When the isolated DC/DC converter 14 is an LLC resonant circuit, since the input voltage is a PFC intermediate bus voltage (Vbus) which is changed adaptively with the output voltage (Vo), the operating frequency of the LLC circuit is close to the resonant frequency, which makes a gain range and an operating frequency narrow and it can make the constant current module reach high efficiency at a wide output voltage range.

When the isolated DC/DC converter 14 is a symmetric half bridge, an asymmetric half bridge or a full bridge, since the input voltage is PFC intermediate bus voltage (Vbus) which is changed adaptively with the output voltage (Vo), the DC/DC circuit 14 can operate at 50% duty cycle. Thus, a variation range of the duty cycle can be small, and then effectively improve the efficiency of the DC./DC converter 14. The above mentioned exemplary embodiment of the invention is a high efficiency constant current driver with single output, and the isolated DC/DC converter 14 has a function as constant current output.

Figure 2:
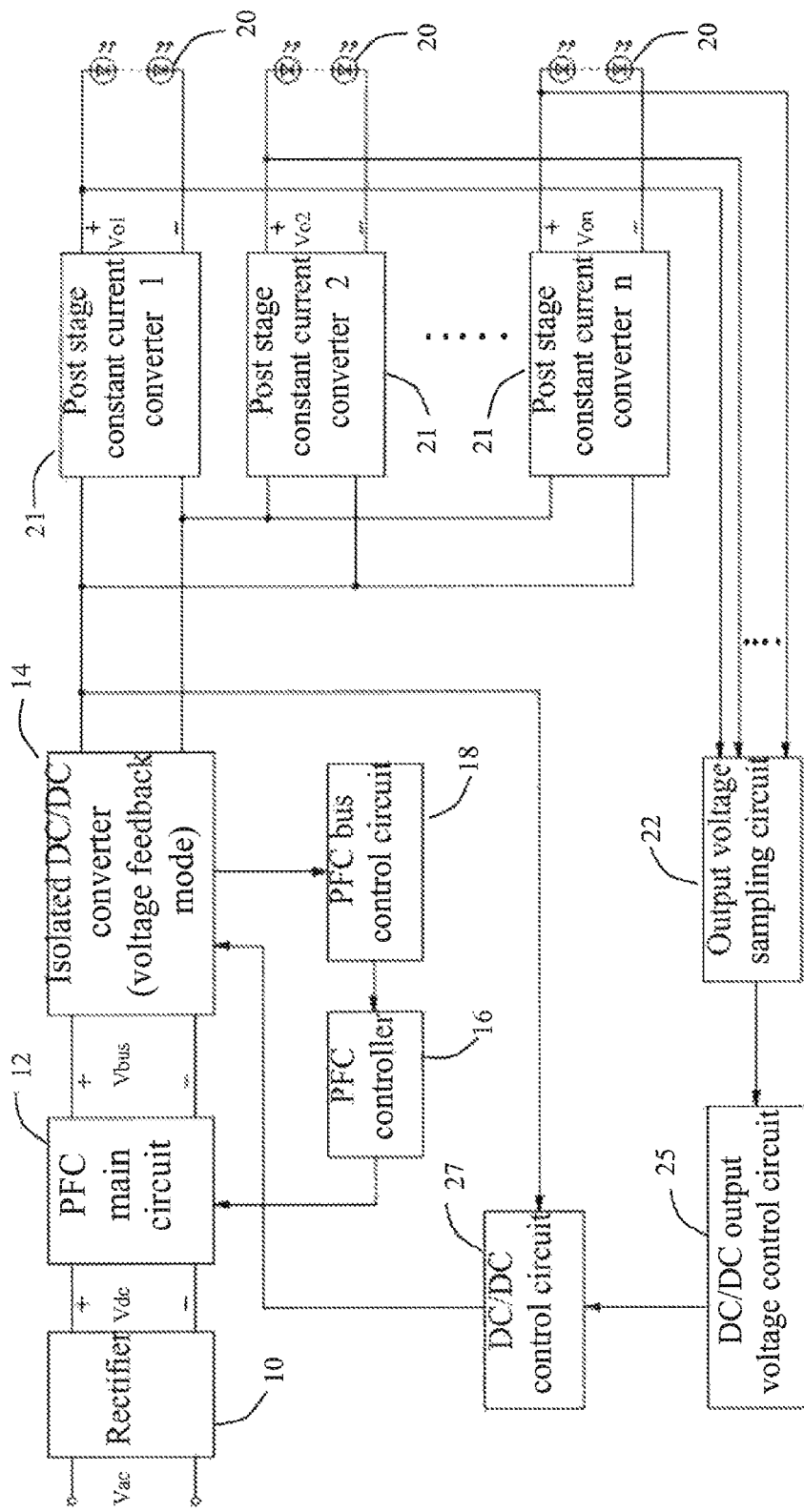
FIG. 2 discloses another block diagram illustrating another exemplary embodiment of a high efficiency constant current LED driver.

FIG. 2 discloses another block diagram illustrating another exemplary embodiment of a high efficiency constant current LED driver. Exemplary embodiments of this invention provide a high efficiency constant current driver with multiple outputs, which comprises a rectification bridge 10, a PFC main circuit 12, an isolated DC/DC converter 14, a PFC controller 16, a PFC bus control circuit 18, a constant current circuit with one output 21 or multiple outputs, an output voltage sampling circuit 22, a DC/DC output voltage control circuit 25, and a DC/DC control circuit 27. The rectification bridge 10 rectifies the AC input voltage (Vac) and then outputs the DC output voltage (Vdc) to the PFC main circuit 12. The PFC main circuit 12 receives the dc voltage (Vdc) from the rectification bridge 10 and the feedback voltage from the PFC controller 16, and then outputs the DC voltage (Vbus) to the DC/DC converter 14 through a power factor correction function. The isolated DC/DC converter 14 receives the DC voltage from the PFC main circuit (Vbus) and the output signal from the DC/DC control circuit 27, and then outputs a DC voltage (Vo) to the LED load 20, and, at the same time, outputs a feedback signal to the DC/DC control circuit 25. The PFC controller 16 receives the control signal from the PFC bus control circuit 18, and sends the feedback signal to the PFC main circuit 12. The PFC bus control circuit 18 samples the signal from the output voltage (Vo) from the DC/DC converter 14 or an equivalent voltage of the output voltage (Vo), and outputs the signal to control the output feedback voltage of the PFC controller 16. Thus, the PFC intermediate bus voltage (Vbus) changes with the output voltage of the DC/DC converter (Vo). The input terminal of the constant current circuit with one output or multiple outputs connects with the isolated DC/DC converter 14, and the circuit outputs the voltage (Vo1, Vo2, . . . , Von) to the LED load 20 while connecting with the input terminal of the output sampling circuit 22. The output terminal of the output sampling circuit 22 is connected with the input terminal of the DC/DC output voltage control circuit 25, whose output terminal is connected with the input terminal of DC/DC control circuit 27. The output voltage of the isolated DC/DC converter 14 changes with the output voltage of the constant current converter 21, which enables the duty cycle of each output to operate at the mostly optimized status and thus achieves a high efficiency. At the same time, the PFC output voltage changes with the isolated DC/DC output voltage in the same way, which enables the isolated DC/DC converter 14 to keep working with a very high efficiency, and consequently improves the overall efficiency of the whole constant current converter with multiple outputs.

Generally, the constant current circuit is a non-isolated DC/DC converter 14, such as a Buck converter or a linear regulator Boost converter. The constant current LED driver with multiple outputs comprises a PFC circuit 12, an isolated DC/DC converter 14, and single or multiple post stage constant current converters 21. The isolated DC/DC converter 14 is a LLC resonant circuit, a symmetric half bridge, an asymmetric half bridge, or a full bridge as the above illustrated.

When the post stage circuits are the buck converters, the output voltage of the isolated DC/DC converter 14 is always tracking the output voltage of the Buck converter, and the output voltage of the DC/DC converter 14 is always slightly higher than the maximum voltage of multiple BUCK converters, and it makes the duty cycle of each output operate at close to 100% and which obtains high efficiency. At the same time, the PFC output voltage is also tracking the DC/DC output voltage as above illustrated; the efficiency of the isolated DC/DC converter 14 is also high. Then the efficiency of the whole constant current converter with multiple outputs is optimized with a high efficiency.

When the post stage circuits are the linear regulators, the output voltage of the isolated DC/DC converter 14 is always tracking the output voltage of the linear regulator, and the output voltage of the DC/DC converter is always slightly higher than the maximum voltage of multiple linear regulators, and it makes the duty cycle of each output operate at close to 100% and which obtains high efficiency. At the same time, the PFC output voltage is also tracking the DC/DC output voltage as above illustrated; the efficiency of the isolated DC/DC converter is also high. Then the efficiency of the whole constant current converter with multiple outputs is optimized with a high efficiency.

When the post stage circuits are the Boost converters, the output voltage of the isolated DC/DC converter is always tracking the output voltage of the Boost converter, and the output voltage of DC/DC converter is always slightly higher than the maximum voltage of multiple Boost converters, and it makes the duty cycle of each output operate at close to 100% and which obtains high efficiency. At the same time, the PFC output voltage is also tracking the DC/DC output voltage as above illustrated; the efficiency of the isolated DC/DC converter is also high. Then the efficiency of the whole constant current converter with multiple outputs is optimized with a high efficiency.

As shown in FIG. 3, the input voltage (Vac) is rectified by the bridge 10 and the LED circuit outputs the DC output voltage (Vdc). The PFC main circuit 12 comprises an inductor L1, a switch S1, a diode D1 and a bus capacitor C1. The positive terminal of rectified voltage (Vdc) is connected with the first terminal of the inductor (L1), while the second terminal of the inductor (L1) is connected with the first terminal of the switch (S1) and the anode of the diode (D1), while the negative terminal of the rectified voltage (Vdc) is connected with the second terminal of the switch (S1). The output voltage of PFC is Vbus.

The output terminal of the PFC controller 16 is connected with the third terminal of the switch (S1), and the series circuit comprised by a first resistor (R1) and a second resistor (R2) is paralleled with the bus capacitor (C1), while the common terminal of the first resistor (R1) and the second resistor (R2), as a feedback signal, is connected with the PFC controller 16, which implements the constant voltage from PFC the Vbus.

The DC/DC converter 14 is a LLC resonant circuit which is comprises a first switch S2, a second switch S3, a resonant inductor L2, a resonant capacitor C2, a transformer T1, a first diode D2, a second diode D3, an output capacitor C3. The positive terminal of bus capacitor of PFC circuit 12 is connected to the first terminal of switch S2, the second terminal of switch S2 is connected to the first terminal of switch S3 and one terminal of resonant inductor L2, the negative terminal of bus capacitor C1 is connected to the second terminal of switch S3. Another terminal of resonant inductor L2 is connected to one terminal of resonant capacitor C2, the primary winding of transformer T1 is paralleled between the second terminal of resonant capacitor C2 and the negative terminal of bus capacitor C1. The secondary winding of transformer T1 is connected to the anode of diode D2 and diode D3, the cathode of diode D2 and diode D3 is connected to the positive terminal of output capacitor C3, the negative terminal of output capacitor C3 is connected to the center-tap of transformer T1. The LED load is paralleled with output capacitor C3. The output voltage of output capacitor (Vo) is the voltage of LED load. The LLC resonant circuit supplies the constant current to LED load.

The PFC bus voltage control circuit 18 comprises an output voltage sampling circuit 22, and a PFC output voltage modulation circuit 24. The input voltage signal of the output voltage sampling circuit 22 comes from a peak voltage holding signal, which comprises a diode D4 and a capacitor C4 from the auxiliary winding of the transformer T1. It is transferred to the signal proportional to the output voltage (Vo) by the output voltage sampling circuit, and then feeds the signal to the PFC output voltage modulation circuit 24.

The PFC output voltage modulation circuit 24 comprises a transistor Q1, a resistor R3 and a VCC. The output signal of the output voltage sampling circuit 22 is connected to the base of transistor Q1, the emitter of transistor Q1 is connected to one terminal of resistor R3, another terminal of resistor R3 is connected to VCC. The collector of transistor Q1 is connected to the feedback signal comprised by resistor R1 and R2, and then changes the intermediate bus voltage (Vbus) of PFC 12 by controlling the PFC controller 16.

The intermediate bus voltage of PFC 12 is the input voltage of LLC resonant converter, which will adaptively change with the output voltage (Vo) of DC/DC converter 14. The operating frequency of the converter 14 is close to the resonant frequency point even with large load variation range, in order to reduce the operating frequency range and improve the efficiency of the converter 14.

As shown in FIG. 4, the input voltage (Vac) is rectified by the bridge 10 and the LED circuit outputs the dc output voltage (Vdc). The PFC main circuit 12 comprises an inductor L1, a switch S1, a diode D1 and a bus capacitor C1. The positive terminal of rectified voltage (Vdc) is connected to the first terminal of inductor L1, the second terminal of inductor L2 is connected to the first terminal of switch S1 and the anode of diode D1, the negative terminal of the rectified voltage (Vdc) is connected to the second terminal of switch S1, bus capacitor C1 is paralleled between the cathode of diode D1 and the second terminal of switch S1. The output voltage of PFC is Vbus.

The output terminal of the PFC controller 16 is connected to the third terminal of switch S1 and it implements the power factor correction function. The circuit 12 is comprised by two resistors R1 and R2 is paralleled with bus capacitor C1 of PFC circuit, the common terminal of resistor R1 and R2 is connected to the feedback terminal of the PFC controller 16 and it implements the normal voltage stabilization of PFC bus voltage (Vbus).

The DC/DC converter 14 is an asymmetric half bridge circuit which is comprised by the first switch S2, the second switch S3, a DC blocking capacitor C2, a transformer T1, the first diode D2, the second diode D3, an output inductor L2, and an output capacitor C3. The positive terminal of bus capacitor of PFC circuit is connected to the first terminal of switch S2, the second terminal of switch S2 is connected to the first terminal of switch S3 and one terminal of dc blocking capacitor C2, the negative terminal of bus capacitor C1 is connected to the second terminal of switch S3. The primary winding of transformer T1 is paralleled between the second terminal of DC blocking capacitor C2 and the negative terminal of bus capacitor C1. The secondary winding of transformer T1 is connected to the anode of diode D2 and diode D3, the cathode of diode D2 and diode D3 is connected to one terminal of output inductor L2, the second terminal of output inductor L2 is connected to the positive terminal of output capacitor C3, and the negative terminal of output capacitor C3 is connected to the center-tap of transformer T1. The LED load 20 is paralleled with output capacitor C3. The output voltage of output capacitor (Vo) is the voltage of LED load 20. The LLC resonant circuit supplies the constant current to LED load 20. The PFC bus voltage control circuit is comprised by an output voltage sampling circuit, a PFC output voltage modulation circuit and so on.

The input voltage signal of the output voltage sampling circuit comes from the peak voltage holding signal, which is comprised by a diode D4 and a capacitor C4 from the auxiliary winding of the transformer T1. It is transferred to the signal proportional to the output voltage (Vo) by the output voltage sampling circuit, and then feeds the signal to PFC output voltage modulation circuit.

The PFC output voltage modulation circuit is comprised by transistor Q1, resistor R3 and VCC. The output signal of the output voltage sampling circuit is connected to the base of transistor Q1, the emitter of transistor Q1 is connected to one terminal of resistor R3, another terminal of resistor R3 is connected to VCC. The collector of transistor Q1 is connected to the feedback signal comprised by resistor R1 and R2, and then changes the intermediate bus voltage (Vbus) of PFC by controlling the PFC controller.

The intermediate bus voltage of PFC is the input voltage of asymmetric half bridge circuit, which will adaptively change with the output voltage (Vo) of DC/DC converter. The duty cycle of the circuit is close to full duty cycle (50%) even with large load variation range, in order to reduce the duty cycle variation range and improve the efficiency of the converter.

As shown in FIG. 5, the input voltage (Vac) is rectified by the bridge 10 and it outputs the DC output voltage (Vdc). The PFC main circuit 12 is comprised by an inductor L1, a switch S1, a diode D1 and a bus capacitor C1.

The positive terminal of rectified voltage (Vdc) is connected to the first terminal of inductor L1, the second terminal of inductor L2 is connected to the first terminal of switch S1 and the anode of diode D1, the negative terminal of the rectified voltage (Vdc) is connected to the second terminal of switch S1, bus capacitor C1 is paralleled between the cathode of diode D1 and the second terminal of switch S1. The output voltage of PFC is Vbus. The output terminal of the PFC controller 16 is connected to the third terminal of switch S1 and it implements the power factor correction function, the circuit is comprised by resistor R1 and R2 is paralleled with bus capacitor C1 of PFC circuit, the common terminal of resistor R1 and R2 is connected to the feedback terminal of the PFC controller and realize the normal voltage stabilization of PFC bus voltage (Vbus).

The DC/DC converter 14 is a symmetric half bridge circuit, which is comprised by the first switch S2, the second switch S3, the first capacitor C2, the second capacitor C4, a transformer T1, the first diode D2, the second diode D3, an inductor L2, and an output capacitor C3.

The positive terminal of the bus capacitor of PFC circuit 12 is connected to the first terminal of switch S2 and the first terminal of capacitor C2, the second terminal of switch S2 is connected to the first terminal of switch S3, named as center point A, and the second terminal of capacitor C2 is connected to the first terminal of capacitor C4, named as center point B, the negative terminal of bus capacitor C1 is connected to the second terminal of switch S3 and the second terminal of capacitor C4. The primary winding of transformer T1 is paralleled between the center point A and B. The secondary winding of transformer T1 is connected to the anode of diode D2 and diode D3, the cathode of diode D2 and diode D3 is connected to one terminal of output inductor L2, the second terminal of output inductor L2 is connected to the positive terminal of output capacitor C3, and the negative terminal of output capacitor C3 is connected to the center-tap of transformer T1. The LED load 20 is paralleled with output capacitor C3. The output voltage of output capacitor (Vo) is the voltage of LED load 20.

The PFC bus voltage control circuit is comprised by an output voltage sampling circuit 22, and a PFC output voltage modulation circuit 24. The input voltage signal of the output voltage sampling circuit comes from the peak voltage holding signal, which is comprised by a diode D4 and a capacitor C4 from the auxiliary winding of the transformer T1. It is transferred to the signal proportional to the output voltage (Vo) by the output voltage sampling circuit, and then feeds the signal to PFC output voltage modulation circuit.

The PFC output voltage modulation circuit 24 comprises a transistor Q1, a resistor R3 and a VCC. The output signal of the output voltage sampling circuit is connected to the base of transistor Q1, the emitter of transistor Q1 is connected to one terminal of resistor R3, another terminal of resistor R3 is connected to VCC. The collector of transistor Q1 is connected to the feedback signal comprised by resistor R1 and R2, and changes the intermediate bus voltage (Vbus) of PFC by controlling the PFC controller.

The intermediate bus voltage of PFC is the input voltage of symmetric half bridge circuit, which will adaptively change with the output voltage (Vo) of DC/DC converter. A duty cycle of the circuit is close to full duty cycle (50%) even with large load variation range, then reduce the duty cycle variation range and improve the efficiency of the converter.

As shown in FIG. 6, the input voltage (Vac) is rectified by the bridge 10 and it outputs the dc output voltage (Vdc). The PFC main circuit 12 comprises an inductor L1, a switch S1, a diode D1 and a bus capacitor C1.

The positive terminal of rectified voltage (Vdc) is connected to the first terminal of inductor L1, the second terminal of inductor L2 is connected to the first terminal of switch S1 and the anode of diode D1, the negative terminal of the rectified voltage (Vdc) is connected to the second terminal of switch S1, bus capacitor C1 is paralleled between the cathode of diode D1 and the second terminal of switch S1. The output voltage of PFC is Vbus.

The output terminal of the PFC controller 16 is connected to the third terminal of switch S1 and realize the power factor correction function, the circuit comprised by resistor R1 and R2 is paralleled with bus capacitor C1 of PFC circuit, the common terminal of resistor R1 and R2 is connected to the feedback terminal of the PFC controller and realize the normal voltage stabilization of PFC bus voltage (Vbus).

The DC/DC converter 14 is a full bridge circuit, which comprises the first switch S2, the second switch S3, the third switch S4, the forth switch S5, a transformer T1, the first diode D2, the second diode D3, an output inductor L2, and an output capacitor C3.

The positive terminal of bus capacitor of PFC circuit is connected to the first terminal of switch S2 and the first terminal of switch S4, the second terminal of switch S2 is connected to the first terminal of switch S3, named as center point A, and the second terminal of switch S4 is connected to the first terminal of switch S5, named as center point B, the negative terminal of bus capacitor C1 is connected to the second terminal of switch S3 and the second terminal of switch S5. The primary winding of transformer T1 is paralleled between the center point A and B. The secondary winding of transformer T1 is connected to the anode of diode D2 and diode D3, the cathode of diode D2 and diode D3 is connected to one terminal of output inductor L2, the second terminal of output inductor L2 is connected to the positive terminal of output capacitor C3, and the negative terminal of output capacitor C3 is connected to the center-tap of transformer T1. The LED load 20 is paralleled with output capacitor C3. The output voltage of output capacitor (Vo) is the voltage of LED load 20.

The PFC bus voltage control circuit comprises an output voltage sampling circuit 22, and a PFC output voltage modulation circuit 24. The input voltage signal of the output voltage sampling circuit 22 comes from the peak voltage holding signal, which comprises a diode D4 and a capacitor C4 from the auxiliary winding of the transformer T1. It is transferred to the signal proportional to the output voltage (Vo) by the output voltage sampling circuit, and then feeds the signal to PFC output voltage modulation circuit 24.

The PFC output voltage modulation circuit 24 comprises a transistor Q1, a resistor R3 and a VCC. The output signal of the output voltage sampling circuit 22 is connected to the base of transistor Q1, the emitter of transistor Q1 is connected to one terminal of resistor R3, another terminal of resistor R3 is connected to VCC. The collector of transistor Q1 is connected to the feedback signal which comprises resistor R1 and R2, and changes the intermediate bus voltage (Vbus) of PFC by controlling the PFC controller.

The intermediate bus voltage of PFC is the input voltage of the full bridge circuit, which will adaptively change with the output voltage (Vo) of DC/DC converter. The duty cycle of the circuit is close to full duty cycle (50%) even with large load variation range, in order to reduce the duty cycle variation range and improve the efficiency of the converter.

Figure 7:
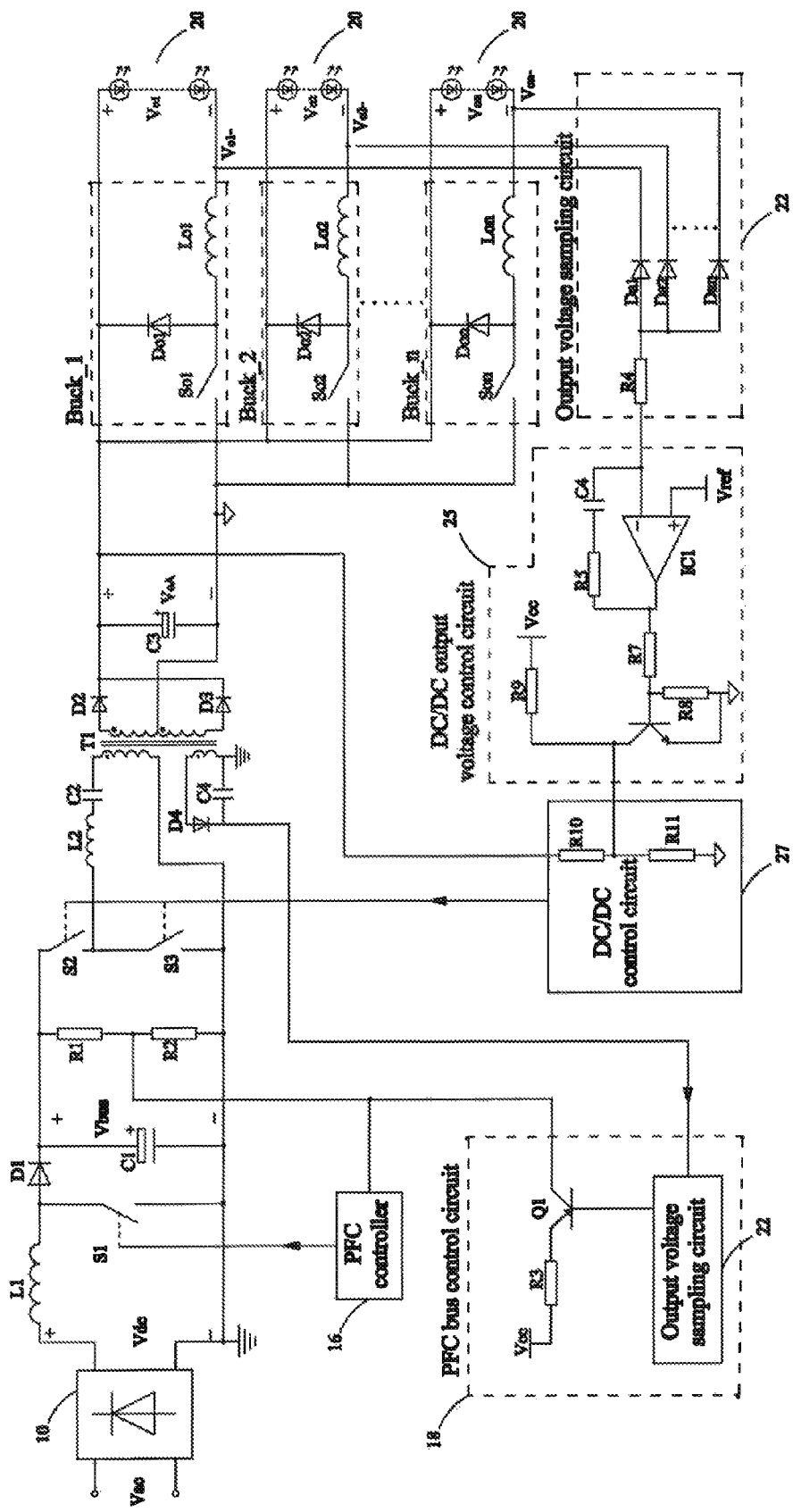
FIG. 7 discloses a circuit schematic of FIG. 2 with a LLC resonant converter.

As shown in FIG. 7, the input voltage (Vac) is rectified by the bridge 10 and it outputs the dc output voltage (Vdc). The PFC main circuit 12 comprises an inductor L1, a switch S1, a diode D1 and a bus capacitor C1.

The positive terminal of rectified voltage (Vdc) is connected to the first terminal of inductor L1, the second terminal of inductor L2 is connected to the first terminal of switch S1 and the anode of diode D1, the negative terminal of the rectified voltage (Vdc) is connected the second terminal of switch S1, bus capacitor C1 is paralleled between the cathode of diode D1 and the second terminal of switch S1. The output voltage of PFC is Vbus.

The output terminal of the PFC controller 16 is connected to the third terminal of switch S1 and realize the power factor correction function, the circuit comprised by resistor R1 and R2 is paralleled with bus capacitor C1 of PFC circuit, the common terminal of resistor R1 and R2 is connected to the feedback terminal of the PFC controller and realize the normal voltage stabilization of PFC bus voltage (Vbus). The DC/DC converter 14 is an LLC resonant circuit, which comprises the first switch S2, the second switch S3, a resonant inductor L2, a resonant capacitor C2, a transformer T1, the first diode D2, the second diode D3, and an output capacitor C3.

The positive terminal of bus capacitor of PFC circuit is connected to the first terminal of switch S2, the second terminal of switch S2 is connected to the first terminal of switch S3 and one terminal of resonant inductor L2, the negative terminal of bus capacitor C1 is connected to the second terminal of switch S3. Another terminal of resonant inductor L2 is connected to one terminal of resonant capacitor C2, the primary winding of transformer T1 is paralleled between the second terminal of resonant capacitor C2 and the negative terminal of bus capacitor C1. The secondary winding of transformer T1 is connected to the anode of diode D2 and diode D3, the cathode of diode D2 and diode D3 is connected to the positive terminal of output capacitor C3, the negative terminal of output capacitor C3 is connected to the center-tap of transformer T1. The LED load 20 is paralleled with output capacitor C3. The output voltage of output capacitor C3 (VoA) is the output voltage of DC/DC converter 14.

The PFC bus voltage control circuit 25 comprises an output voltage sampling circuit 22, and a PFC output voltage modulation circuit. The input voltage signal of the output voltage sampling circuit 22 comes from the peak voltage holding signal, which is comprised by a diode D4 and a capacitor C4 from the auxiliary winding of the transformer T1. It is transferred to the signal proportional to the output voltage (Vo) by the output voltage sampling circuit 22, and then feeds the signal to PFC output voltage modulation circuit.

The PFC output voltage modulation circuit, or bus control circuit 18 is comprised by a transistor Q1, a resistor R3 and a VCC. The output signal of the output voltage sampling circuit is connected to the base of transistor Q1, the emitter of transistor Q1 is connected to one terminal of resistor R3, another terminal of resistor R3 is connected to VCC. The collector of transistor Q1 is connected to the feedback signal comprised by resistor R1 and R2, and changes the intermediate bus voltage (Vbus) of PFC by controlling the PFC controller 16.

The intermediate bus voltage of the PFC is the input voltage of LLC resonant converter, which will adaptively change with the output voltage (VoA) of DC/DC converter 14. The operating frequency of the converter is close to the resonant frequency point even with large load variation range, in order to reduce the operating frequency range and improve the efficiency of the converter.

The output voltage of the isolated DC/DC converter (VoA) is the input voltage of post stage constant current converter, the post stage constant current converter is comprised by multiple Buck circuits (Buck_1, . . . Buck_n). Each Buck circuit can supply one output with constant current control function. For convenient to illuminate, Buck_1 is as an example, other circuit structure of Buck circuit is same. The Buck circuit comprises one switch So1, one diode Do1, one inductor Lo1 and LED load 20. The output capacitor C3 of the isolated DC/DC converter 14 is connected to the cathode of diode Do1, and the anode of diode Do1 is connected to the first terminal of inductor Lo1. The LED load 20 is paralleled between the cathode of diode Do1 and the second terminal of Lo1. The LED load 20 is multiple strings. The output voltage of circuit Buck_1, . . . , Buck_n is Vo1, . . . , Von.

The output voltage sampling circuit 22 comprises diodes Da1, . . . , Dan and a resistor (R4). The negative terminals of the output voltages (Vo1−, . . . , Von−) are connected with the cathodes of the diodes (Da1, . . . , Dan) respectively. The anodes of the diodes (Da1, . . . , Dan) are connected with the first terminal of the resistor (R4), and the second terminal of the resistor (R4) is connected with the input terminal of the DC/DC output voltage control circuit. the DC/DC output control circuit comprises an amplifier (IC1), a first resistor (R5), a second resistor (R7), a third resistor (R8), a fourth resistor (R9), a capacitor (C4) and a transistor (Q2). The second terminal of the resistor (R4) of the output voltage sampling circuit is connected with the inverting terminal of the amplifier (IC1) and the first terminal of the capacitor (C4), while the second terminal of the capacitor (C4) is connected with the first terminal of the first resistor (R5), and the second terminal of the first resistor (R5) is connected to the output terminal of the amplifier (IC1). The non-inverting terminal of the amplifier (IC1) is the voltage reference signal (Vref), and the output terminal of the amplifier (IC1) is connected with the first terminal of the second resistor (R7), while the second terminal of the second resistor (R7) is connected with the first terminal of the third resistor (R8) and the base of the transistor (Q2). The second terminal of third resistor (R8) is connected with the emitter of the transistor (Q2), and then connected to the output ground. The collector of the transistor (Q2) is connected with the first terminal of the fourth resistor (R9), and the second terminal of the fourth resistor (R9) is connected with the feedback signal terminal of the feedback circuit of the DC/DC control circuit which is comprised by resistor R10 and R11.

For the output voltage sampling circuit 22, the minimum voltage of the negative terminal of output voltage (Vo1−, . . . Von−) (means the maximum voltage of LED output voltage (Vo1, . . . Von)) is compared with the reference signal Vref, and controls the conduction status of Q2 through amplifier IC1, resistor R5, resistor R6, and output capacitor C4, which changes the feedback signal of DC/DC control circuit, in order to change the output voltage of isolated DC/DC converter 14. So the output voltage of DC/DC converter is always higher than the maximum voltage of multiple output of Buck circuit (Buck_1, ..., Buck_n), and then Buck circuit can not only accurately control the constant current circuit, but also operate at almost 100% duty cycle and improves the operating efficiency of post stage constant current converter.

Figure 8:
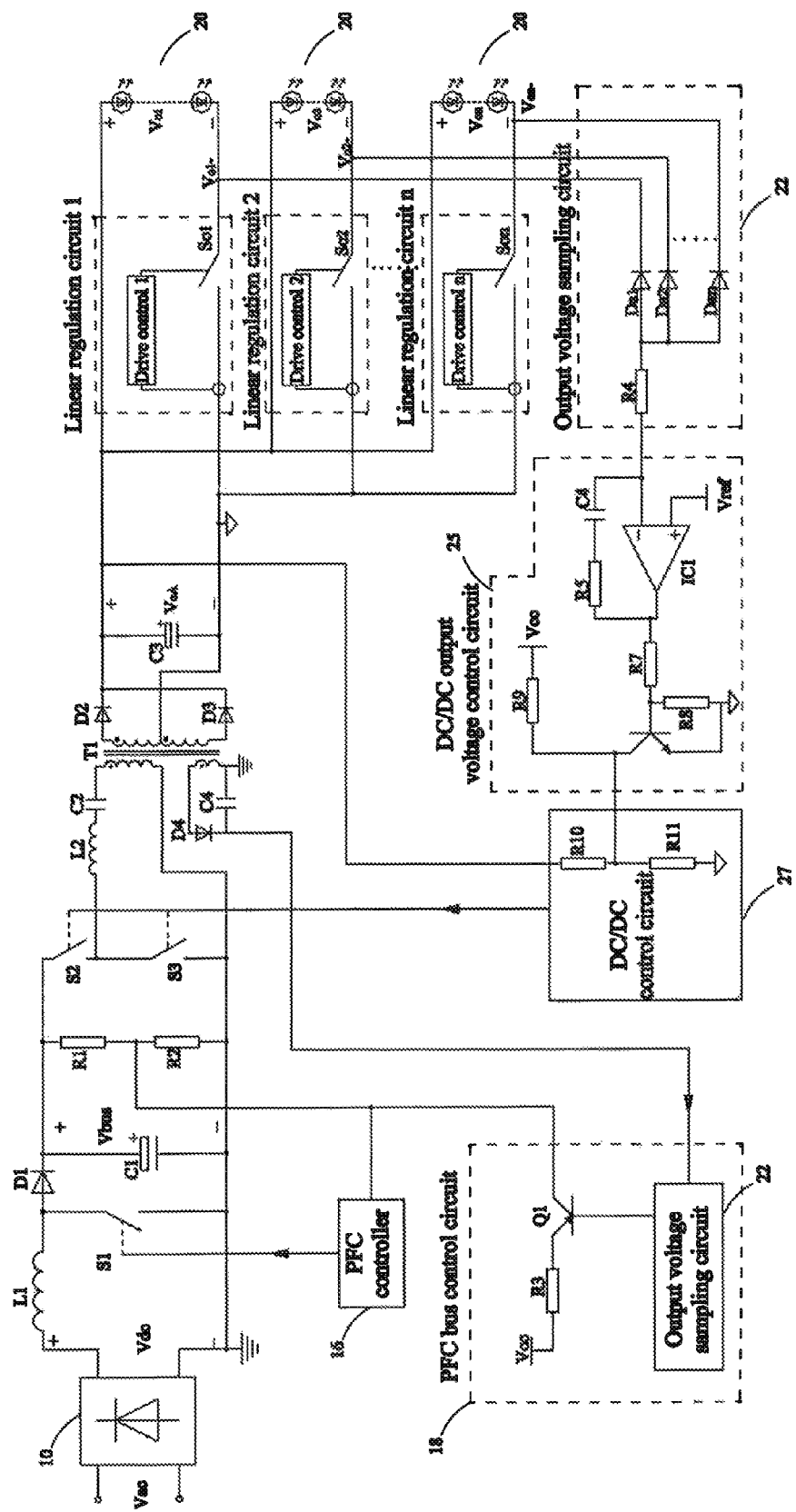
FIG. 8 discloses another circuit schematic of FIG. 2 with a LLC resonant converter.

As shown in FIG. 8, the input voltage (Vac) is rectified by the bridge and it outputs the DC output voltage (Vdc). The PFC main circuit 12 comprises an inductor L1, a switch S1, a diode D1 and a bus capacitor C1.

The positive terminal of rectified voltage (Vdc) is connected to the first terminal of inductor L1, the second terminal of inductor L2 is connected to the first terminal of switch S1 and the anode of diode D1, the negative terminal of the rectified voltage (Vdc) is connected to the second terminal of switch S1, bus capacitor C1 is paralleled between the cathode of diode D1 and the second terminal of switch S1. The output voltage of PFC is Vbus.

The output terminal of the PFC controller is connected to the third terminal of switch S1 and it implements the power factor correction function, the circuit comprised by resistor R1 and R2 is paralleled with bus capacitor C1 of PFC circuit, the common terminal of resistor R1 and R2 is connected to the feedback terminal of the PFC controller and it implements the normal voltage stabilization of PFC bus voltage (Vbus). The DC/DC converter is an LLC resonant circuit, which comprises the first switch S2, the second switch S3, a resonant inductor L2, a resonant capacitor C2, a transformer T1, the first diode D2, the second diode D3, and an output capacitor C3.

The positive terminal of bus capacitor of PFC circuit is connected to the first terminal of switch S2, the second terminal of switch S2 is connected to the first terminal of switch S3 and one terminal of resonant inductor L2, the negative terminal of bus capacitor C1 is connected to the second terminal of switch S3. Another terminal of resonant inductor L2 is connected to one terminal of resonant capacitor C2, the primary winding of transformer T1 is paralleled between the second terminal of resonant capacitor C2 and the negative terminal of bus capacitor C1. The secondary winding of transformer T1 is connected to the anode of diode D2 and diode D3, the cathode of diode D2 and diode D13 is connected to the positive terminal of output capacitor C3, the negative terminal of output capacitor C3 is connected to the center-tap of transformer T1. The LED load 20 is paralleled with output capacitor C3. The output voltage of output capacitor C3 (VoA) is the output voltage of DC/DC converter 14.

The PFC bus voltage control circuit 25 comprises an output voltage sampling circuit 22, and a PFC output voltage modulation circuit. The input voltage signal of the output voltage sampling circuit 22 comes from the peak voltage holding signal, which is comprised by a diode D4 and a capacitor C4 from the auxiliary winding of the transformer T1. It is transferred to the signal proportional to the output voltage (Vo) by the output voltage sampling circuit, and then feeds the signal to PFC output voltage modulation circuit.

The PFC output voltage modulation circuit 22 comprises a transistor Q1, a resistor R3 and a VCC. The output signal of the output voltage sampling circuit is connected to the base of transistor Q1, the emitter of transistor Q1 is connected to one terminal of resistor R3, another terminal of resistor R3 is connected to VCC. The collector of transistor Q1 is connected to the feedback signal comprised by resistor R1 and R2, and changes the intermediate bus voltage (Vbus) of PFC by controlling the PFC controller.

The intermediate bus voltage of PFC is the input voltage of LLC resonant converter, which will adaptively change with the output voltage (VoA) of DC/DC converter. The operating frequency of the converter is close to the resonant frequency point even with large load variation range, in order to reduce the operating frequency range and improve the efficiency of the converter.

The output voltage of the isolated DC/DC converter (VoA) is the input voltage of post stage constant current converter, the post stage constant current converter is comprised by multiple linear regulator circuit (Linear regulator_1, ... Linear regulator_n). Each linear regulator circuit can supply one output with constant current control function. For convenient to illuminate, Linear regulator_1 is as an example, other circuit structure of linear regulator circuit is same. The linear regulator circuit is comprised by one switch So1, one diode Do1, one inductor Lo1 and LED load. The output capacitor C3 of the isolated DC/DC converter is connected to the cathode of diode Do1, and the anode of diode Do1 is connected to the first terminal of inductor Lo1, LED load is paralleled between the cathode of diode Do1 and the second terminal of Lo1. The LED load is multiple strings. The output voltage of circuit linear regulator_1, ..., linear regulator_n is Vo1, ..., Von.

The output voltage sampling circuit comprises diodes Da1, ..., Dan and a resistor (R4). The negative terminals of the output voltages (Vo1−, ..., Von−) are connected with the cathodes of the diodes (Da1, ..., Dan) respectively. The anodes of the diodes (Da1, ..., Dan) are connected with the first terminal of the resistor (R4), and the second terminal of the resistor (R4) is connected with the input terminal of the DC/DC output voltage control circuit. the DC/DC output control circuit comprises an amplifier (IC1), a first resistor (R5), a second resistor (R7), a third resistor (R8), a fourth resistor (R9), a capacitor (C4) and a transistor (Q2). The second terminal of the resistor (R4) of the output voltage sampling circuit is connected with the inverting terminal of the amplifier (IC1) and the first terminal of the capacitor (C4), while the second terminal of the capacitor (C4) is connected with the first terminal of the first resistor (R5), and the second terminal of the first resistor (R5) is connected to the output terminal of the amplifier (IC1). The non-inverting terminal of the amplifier (IC1) is the voltage reference signal (Vref), and the output terminal of the amplifier (IC1) is connected with the first terminal of the second resistor (R7), while the second terminal of the second resistor (R7) is connected with the first terminal of the third resistor (R8) and the base of the transistor (Q2). The second terminal of third resistor (R8) is connected with the emitter of the transistor (Q2), and then connected to the output ground. The collector of the transistor (Q2) is connected with the first terminal of the fourth resistor (R9), and the second terminal of the fourth resistor (R9) is connected with the feedback signal terminal of the feedback circuit of the DC/DC control circuit which is comprised by resistor R10 and R11.

For the output voltage sampling circuit, the minimum voltage of the negative terminal of output voltage (Vo1−, ... Von−) (means the maximum voltage of LED output voltage (Vo1, ... Von)) is compared with the reference signal Vref, and controls the conduction status of Q2 through amplifier IC1, resistor R5, resistor R6, and output capacitor C4, which changes the feedback signal of DC/DC control circuit, in order to change the output voltage of isolated DC/DC converter. So the output voltage of DC/DC converter is always higher than the maximum voltage of multiple output of linear regulator circuit (Linear regulator_1, ..., Linear regulator_n), and then linear regulator circuit can not only accurately control the constant current circuit, but also operate at almost 100% duty cycle and improve the operating efficiency of post stage constant current converter.

It should be understood that the above mentioned embodiments are just the illumination of an exemplary embodiment of the present invention, but not limited to the invention. All extended solutions or substitutions based on the principle and content of the exemplary embodiments of this invention should be regarded as Inventors' claims to be protected.

What is claimed is:

1. A constant current LED driver comprising:
   a rectification bridge;
   a power factor correction ("PFC") main circuit;
   an isolated DC/DC converter;
   a PFC controller; and
   a PFC bus control circuit;
   wherein the rectification bridge is configured to rectify an AC input voltage (Vac) and output a first DC voltage (Vdc) to the PFC main circuit;
   wherein the PFC main circuit is configured to receive the first DC voltage (Vdc) from the rectification bridge and a feedback voltage from the PFC controller, and output a second DC voltage (Vbus) to the isolated DC/DC converter;
   wherein the isolated DC/DC converter is configured to receive the second DC voltage (Vbus) from the PFC main circuit, and output a third DC voltage (Vo) to an LED load and supply a constant current to the LED load;
   wherein the PFC controller is configured to receive a control signal from the PFC bus control circuit, and send the feedback signal to the PFC main circuit;
   wherein the PFC bus control circuit is configured to sample the signal from the third DC voltage (Vo) of the isolated DC/DC converter or an equivalent voltage of the third DC voltage (Vo), and output the control signal to the PFC controller;
   wherein the second DC voltage (Vbus) changes with the third DC voltage (Vo); and
   wherein the PFC bus control circuit further comprises an output voltage sampling circuit and a PFC output voltage modulation circuit, wherein an input voltage signal of the output voltage sampling circuit comes from an auxiliary winding in a main transformer (T1) of the isolated DC/DC converter, and it is configured to maintain a peak signal with a diode (D4) and a capacitor (C4), and wherein the output voltage sampling circuit is further configured to convert the peak signal to a signal that is proportional to the third DC voltage (Vo), and to feed the signal to the PFC output voltage modulation circuit, and wherein the output terminal of the PFC output voltage modulation circuit is configured to connect with the input terminal of the PFC controller.

2. A constant current LED driver as claimed in claim 1, wherein the PFC main circuit comprises:
   an inductor (L1);
   a switch (S1);
   a diode (D1); and
   a bus capacitor (C1);
   wherein the positive terminal of rectified voltage (Vdc) is connected with a first terminal of the inductor (L1), while a second terminal of the inductor (L1) is connected with a first terminal of the switch (S1) and an anode of the diode (D1), while a negative terminal of the rectified voltage (Vdc) is connected with a second terminal of the switch (S1);
   wherein the bus capacitor (C1) is parallel to a series connection of a cathode of the diode (D1) and the second terminal of the switch (S1);
   wherein the output terminal of the PFC controller is connected with a third terminal of the switch (S1) and a series circuit comprising a first resistor (R1) and a second resistor (R2) in parallel with the bus capacitor (C1); and
   wherein a common terminal of the first resistor (R1) and the second resistor (R2) is connected with the input terminal of the PFC controller and the output terminal of the PFC output voltage modulation circuit.

3. A constant current LED driver as claimed in claim 2, wherein the PFC output voltage modulation circuit comprises:
   a transistor (Q1);
   a resistor (R3); and
   a power supply (VCC);
   wherein the output terminal of the output voltage sampling circuit is connected with a base of the transistor (Q1), and an emitter of the transistor (Q1) is connected with a first terminal of the resistor (R3), while a second terminal of the resistor (R3) is connected with a power supply (VCC), and a collector of the transistor (Q1) is connected with the common terminal of the first resistor (R1) and the second resistor (R2).

4. A constant current LED driver as claimed in claim 3, wherein the isolated DC/DC converter comprises LLC resonant circuit, a symmetric half bridge circuit, an asymmetric half bridge circuit, or a full bridge circuit.

5. A constant current LED driver as claimed in claim 2, wherein the isolated DC/DC converter comprises LLC resonant circuit, a symmetric half bridge circuit, an asymmetric half bridge circuit, or a full bridge circuit.

6. A constant current LED driver as claimed in claim 1, wherein the isolated DC/DC converter comprises LLC resonant circuit, a symmetric half bridge circuit, an asymmetric half bridge circuit, or a full bridge circuit.

7. A constant current LED driver as claimed in claim 1, wherein the isolated DC/DC converter comprises LLC resonant circuit, a symmetric half bridge circuit, an asymmetric half bridge circuit, or a full bridge circuit.

8. A high efficiency constant current LED driver comprising:
   a rectification bridge;
   a PFC main circuit;
   an isolated DC/DC converter;
   a PFC controller,
   a PFC bus control circuit;
   one or more constant current circuits;
   an output voltage sampling circuit;
   a DC/DC output voltage control circuit; and
   a DC/DC control circuit;
   wherein the rectification bridge is configured to rectify an AC input voltage (Vac) and output a DC output voltage (Vdc) to the PFC main circuit;
   wherein the PFC main circuit is configured to receive the DC voltage (Vdc) from the rectification bridge and a feedback voltage from the PFC controller and then output a DC voltage (Vbus) to the isolated DC/DC converter;
   wherein the isolated DC/DC converter receives the DC voltage (Vbus) from the PFC main circuit and an output signal from the DC/DC control circuit, and then outputs a DC voltage (Vo) to an LED load, and, at the same time, outputs a first feedback signal to the DC/DC control circuit;
   wherein the PFC controller is configured to receive a control signal from the PFC bus control circuit and send a second feedback signal to the PFC main circuit;
   wherein the PFC bus control circuit is configured to sample a signal from the output voltage (Vo) of the isolated DC/DC converter or an equivalent voltage of an output voltage (Vo) and output the signal to control the output feedback voltage of the PFC controller so that the DC voltage (Vbus) outputted from the PFC main circuit changes with the output voltage of the DC/DC converter (Vo);

wherein an input terminal of each constant current circuit of the one or more constant current circuits is connected to an output terminal of the isolated DC/DC converter together, and the output terminal of the constant current circuit is connected to a respective LED load;

wherein the output terminal of the output voltage sampling circuit is connected to an input terminal of the DC/DC output voltage control circuit to its output terminal connected with the input terminal of the DC/DC control circuit;

wherein the output voltage of the isolated DC/DC converter is configured to change with an output voltage of the one or more constant current circuits; and wherein an output voltage of the PFC main circuit is configured to change with the isolated DC/DC output voltage; and wherein the output voltage sampling circuit comprises:
diodes (Da1, . . . , Dan); and
a resistor (R4);

wherein negative terminals of the output voltages (Vo1−, . . . , Von−) are connected with the respective cathodes of the diodes (Da1, . . . , Dan); anodes of the diodes (Da1, . . . , Dan) are connected with a first terminal of the resistor (R4), and a second terminal of the resistor (R4) is connected with the input terminal of the DC/DC output voltage control circuit.

9. A high efficiency constant current LED driver as claimed in claim 8, wherein the constant current circuit comprises a non-isolated DC/DC converter, a Buck converter, a linear regulator, or a Boost converter.

10. A A high efficiency constant current LED driver as claimed in claim 8, wherein the DC/DC output voltage control circuit comprises:

an amplifier (IC1);
a first resistor (R5);
a second resistor (R7);
a third resistor (R8);
a fourth resistor (R9);
a capacitor (C4); and
a transistor (Q2);

wherein the second terminal of the resistor (R4) of the output voltage sampling circuit is connected with an inverting terminal of the amplifier (IC1) and a first terminal of the capacitor (C4), while a second terminal of the capacitor (C4) is connected with a first terminal of the first resistor (R5), and a second terminal of the first resistor (R5) is connected to an output terminal of the amplifier (IC1);

wherein a non-inverting terminal of the amplifier (IC1) is the voltage reference signal (Vref), and an output terminal of the amplifier (IC1) is connected with a first terminal of the second resistor (R7), while a second terminal of the second resistor (R7) is connected with a first terminal of the third resistor (R8) and a base of the transistor (Q2);

wherein a second terminal of the third resistor (R8) is connected with an emitter of the transistor (Q2) and is connected to an output ground; and wherein a collector of the transistor (Q2) is connected with a first terminal of the fourth resistor (R9), and a second terminal of the fourth resistor (R9) is connected with a feedback signal terminal of a feedback circuit of the DC/DC control circuit.

11. A high efficiency constant current LED driver as claimed in claim 8, wherein the DC/DC control circuit comprises a first resistor (R10) and a second resistor (R11); and wherein the first resistor (R10) and the second resistor (R11) are in parallel with an output portion of the isolated DC/DC converter; and wherein a feedback signal terminal is a common terminal of the first resistor (R10) and the second resistor (R11).

* * * * *